Dec. 8, 1953 C. S. WEYANDT 2,662,192
AXIAL ELECTROMAGNETIC MOTOR WITH
OPPOSITELY FACING POLE FACES
Filed March 7, 1951 3 Sheets-Sheet 1

INVENTOR.
Carl S. Weyandt
BY William D. Carothers
His Attorney.

Dec. 8, 1953

C. S. WEYANDT 2,662,192

AXIAL ELECTROMAGNETIC MOTOR WITH
OPPOSITELY FACING POLE FACES

Filed March 7, 1951

INVENTOR.
Carl S. Weyandt
BY
William D. Carothers
His Attorney.

Dec. 8, 1953

C. S. WEYANDT 2,662,192

AXIAL ELECTROMAGNETIC MOTOR WITH
OPPOSITELY FACING POLE FACES

Filed March 7, 1951

INVENTOR.
Carl S. Weyandt
BY
William D. Carothers
His Attorney.

Patented Dec. 8, 1953

2,662,192

UNITED STATES PATENT OFFICE 2,662,192

AXIAL ELECTROMAGNETIC MOTOR WITH OPPOSITELY FACING POLE FACES

Carl S. Weyandt, Homer City, Pa.

Application March 7, 1951, Serial No. 214,360

7 Claims. (Cl. 310—38)

This invention relates generally to electromagnetic motors for use as feeder motors or packing motors and more particularly to an electro-magnetic motor having oppositely facing pole faces.

The principal object of this invention is the provision of an electro-magnetic motor designed to be the sole source of operative force for a circular or helical feeder or other similar device and wherein the pole faces are facing opposite directions on either side of a central axis around which the motor parts are symmetrically mounted. With this construction a single axially mounted motor will deliver greater electrical energy impulses at greater efficiency than that of a similarly mounted motor having the pole faces all lying in a common horizontal plane. By having oppositely facing pole faces on the electro-magnet motor members they approach an electrical efficiency greater than by the use of dual motors disposed diametrically opposite to one another and functioning with their full faces facing in opposite direction.

Another object is the provision of an electromagnetic motor wherein the pole faces lie in planes substantially parallel with the angular disposition of the springs supporting the vibratory member of the motor. This disposition of the pole faces directs the energy impulses in line with the movement of the springs.

Another object is the provision of an electromagnetic motor having oppositely facing pole faces which are substantially vertical. This disposition of the pole faces directs the energy impulses at an angle to the movement of the springs but in phase with the arcuate movement about the central axis of the device.

Other objects and advantages appear hereinafter in the following description and claims.

The accompanying drawings show, for the purpose of exemplification without limiting the invention or the claims thereto, certain practical embodiments of the invention wherein:

Figure 1:
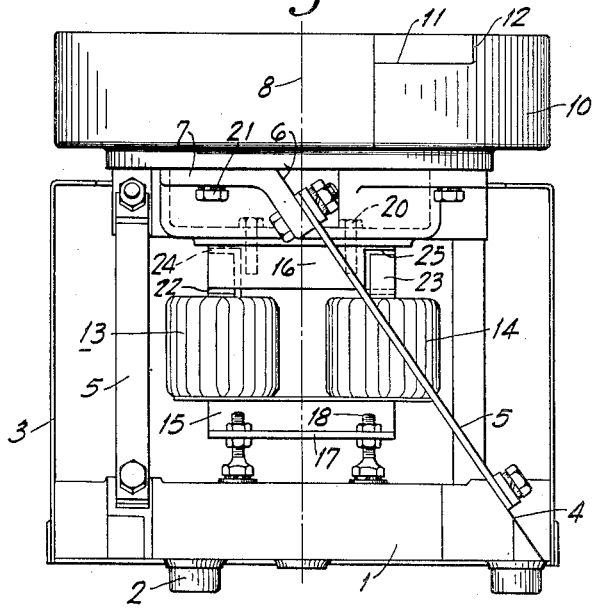
Fig. 1 is a side elevation illustrating an electromagnetic motor comprising this invention.
Figure 2:
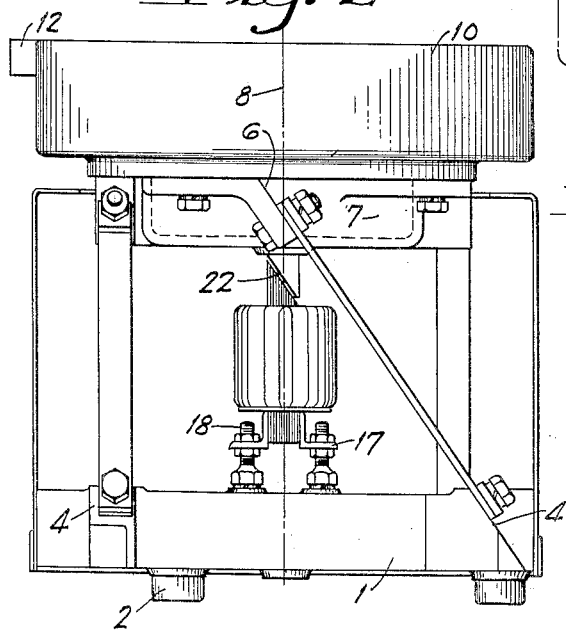
Fig. 2 is a side elevation of the motor shown in Fig. 1 taken at right angles from that shown in Fig. 1.

Referring to the drawings and particularly Figs. 1 and 2 the vibratory motor comprises the heavy massive base 1, which is preferably a casting supported by the rubber feet 2 and having mounted thereon the annular casing 3 which encloses the motor and the control parts therefor which are not shown, but which ordinarily consist of the rheostat and the rectifier as the electro-magnetic motors are arranged for operating on electro-magnetic impulses created from halfwave rectification of alternating current, although the intermittent current impulses may be obtained by other methods.

A base 1 is provided with a plurality of sloping seats 4 upon which the lower end of the tuned spring means, such as the leaf springs 5, are mounted. The upper ends of the leaf springs are secured to the seats 6 which are formed on the underside of the frame member 7. It will be noted from Figs. 1 and 2 that the seats 4 and the spring means 5 are positioned symmetrically about the central axis of the frame 7, which axis is indicated by the construction line 8. As shown in these views the frame 7 is supporting in this case a feeder bowl 10 which has formed therein a helical conveying trough, as indicated at 11, which extends out of the upper end of the feeder bowl. The articles to be fed up the inclined trough 11 are emptied into the center of the bowl 10 and by the vibration of the bowl the articles in turn are fed around the helix of the incline 11 and come out the mouth as indicated at 12.

Figure 3:
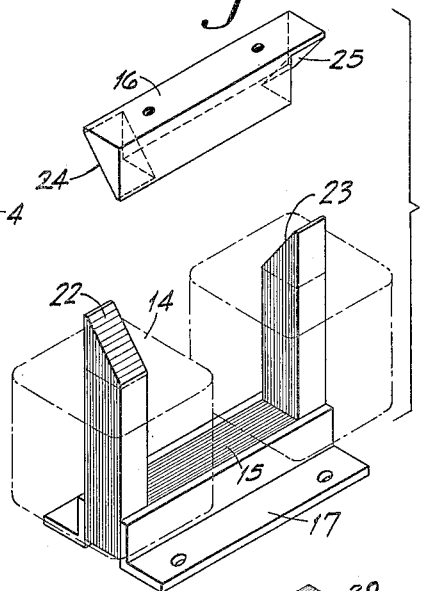
Fig. 3 is an isometric detailed view showing the core and armature structure of the character of motor illustrated in Figs. 1 and 2.
Figure 4:
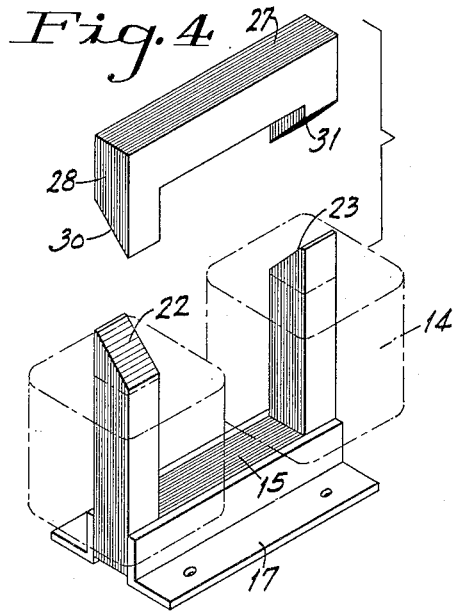
Fig. 4 shows an isometric modified form of armature to be employed with the motor structure as shown in Figs. 1 to 3.
Figure 5:
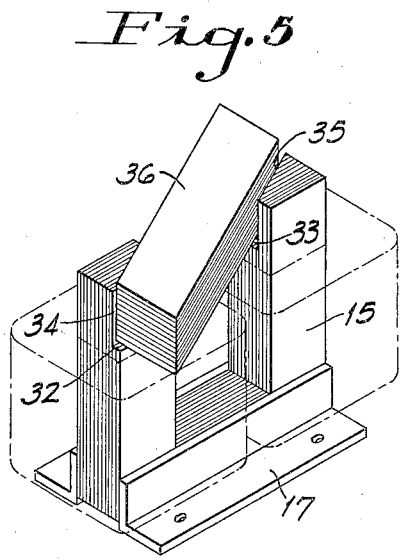
Fig. 5 is an isometric view of the armature and core member of an electro-magnetic motor showing the oppositely facing pole faces lying in vertical planes.

The electro-magnetic motor 13 comprises the electro-magnetic field member having the coils 14 set upon opposite legs of the core member 15. The other electro-magnetic motor part is the armature 16 of which there are different types as shown in Figs. 3, 4 and 5. The armature as shown in Figs. 1 and 2 is similar to that shown in Fig. 3.

The core member 15 has secured thereto oppositely disposed angle brackets 17 that are mounted on the posts 18 secured to the base. These mounting posts center the electro-magnetic motor 13 relative to the frame 7 as indicated by the construction line 8 and also provide means for adjusting the relative position of the field unit to the armature. This adjustment may be vertical or slightly tilted to provide the proper relative positions of the opposed pole faces.

The coils 14 of the electro-magnetic field of the motor 13 may be constructed so as to be connected in series and operated on the 220 volt, 60 cycle, circuit or connected in parallel when operating on a 110 volt circuit, thus one motor may suffice to supply sufficient power to the feeder for a different voltage range. However, as previously stated, a single wave rectifier is usually placed in series with the windings of the field of the electro-magnetic motor in order to provide intermittent half-wave current impulses for operating the same and to regulate the amplitude of vibration one merely changes the voltage across the coils by means of a rheostat.

The armature 16 is secured to the frame 7 by means of the bolts 20. The frame 7 which is shown to be of hollow casting and is provided with the bolts 21 for the purpose of securing the bowl 19 thereto or any other type of apparatus in which is desired to provide a circular feeding motion to the material, which circular feeding motion will cause the material to flow around the container and, if it is provided with an upwardly extending helix, the material will continue to flow to different elevations and thereby becomes a helical feeder owing to the fact that the movement of the frame and everything that supports moves in a confined inclined arcuate path about the central axis, which movement retraces itself in both directions.

In the motor, as illustrated at Figs. 1, 2 and 3, the core member 15 is provided with the oppositely facing pole faces 22 and 23 which are also illustrated in Figs. 4 and 5. These pole faces represent the pair of pole faces on the core member and they face in opposite directions. They also have substantially the same slope as that of the spring means 5 as illustrated in Fig. 2.

The armature 16 is rectangular in cross section and has two notches cut in the ends thereof to provide the pole faces 24 and 25 as shown in Fig. 3. The pole face 24 functions to operate with the pole face 22 and the core face 25 co-operates with the pole face 23 of the core. However in a structure of this kind the armature member and the field members may be reversed relative to one another. The pole faces 24, thus, have the same slope as the pole faces 22 and 23. These pole faces represent the pair of pole faces of the armature which face in opposite directions.

As shown in Fig. 4 the armature member 27 has downwardly projecting legs 29 which are likewise provided with oppositely facing pole faces 30 and 31 that correspond with the similar sloping pole faces 22 and 23. The only difference between these two structures is that the pole faces 30 and 31 are disposed on depending legs, whereas the pole faces 24 and 25 are constructed by notching the ends of the armature.

Referring to Fig. 5 notches 32 and 33 have been cut out of the upper end of the core member 15 to provide a pair of pole faces which face in opposite directions, as illustrated at 34 and 35, and the armature member 36, which is preferably a laminated structure, is substantially rectangular in cross section for its full length and the opposite sides of the opposite ends of this armature face in opposite directions to function as the pole faces. The laminations may be normal to these pole faces. Thus the armature 36 has a pair of pole faces which are disposed at opposite ends of the armature member and which face in opposite directions.

Figure 9:
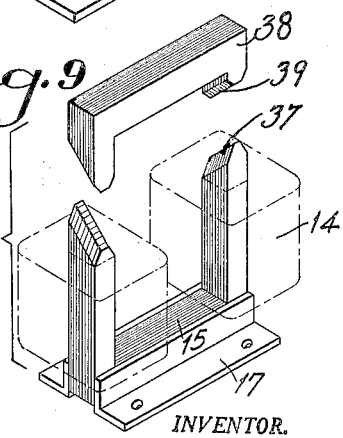
Fig. 9 is an isometric detailed view showing the core and armature structure of the character of motor illustrated in Fig. 6.
Figure 6:
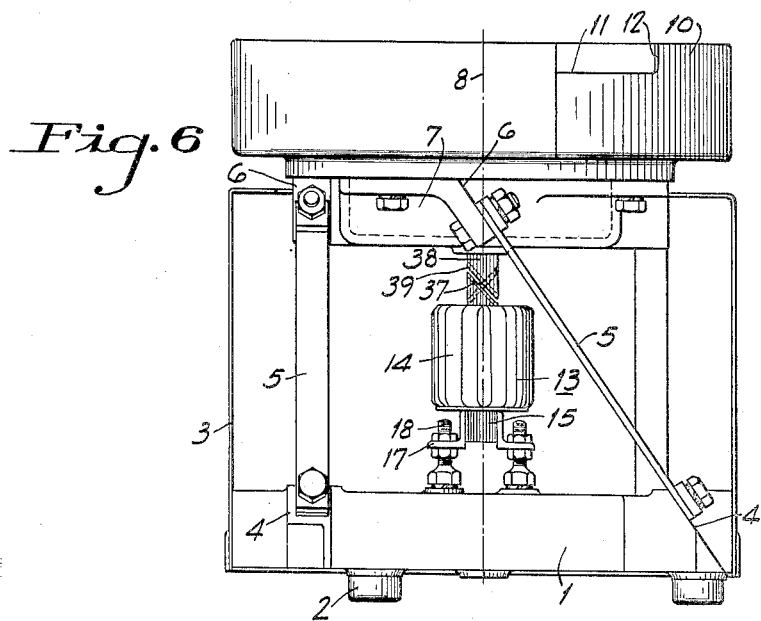
Fig. 6 is a side elevation of a concentrated air gap electro-magnetic motor as applied to the structure as shown in Figs. 1 and 2.

As shown in Fig. 6 the core member 15 of the electro-magnetic motor is provided with sloping pole faces 37 and the armature member 38 has the complementary sloping pole faces 39 but they are smaller in area and are offset. At the opposite end of the armature the pole faces slope in the opposite direction as is indicated in dotted lines. This structure is better illustrated in Fig. 9, wherein the pointed pole faces 37 and 39 concentrate the flux on the opposed pole face points which provides a more effective twisting pull on the armature.

Figure 7:
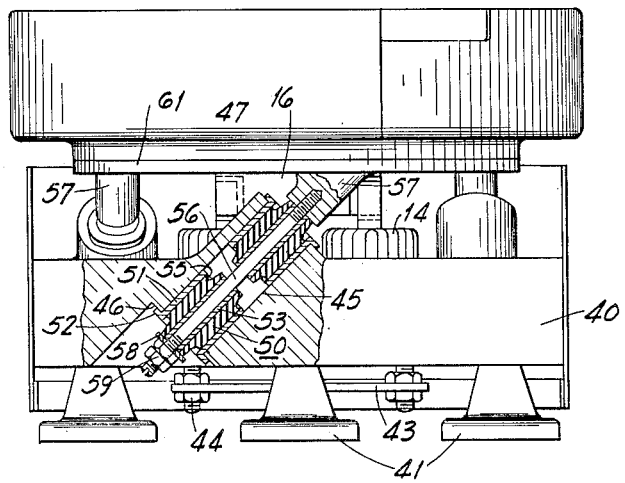
Fig. 7 is an elastomer supported vibratory motor having an electro-magnetic motor with oppositely facing pole faces.

The structure as shown in Fig. 7 is likewise a bowl feeder such as illustrated in Figs. 1 and 2. However the base casting 40 is likewise supported by the rubber feet 41 and is provided with an annular opening 42 for receiving the core member 15 of the electro-magnetic motors, which core member has the coils 14 mounted thereon and is supported by plate 43 which is bolted by the studs 44 to the base.

Figure 8:
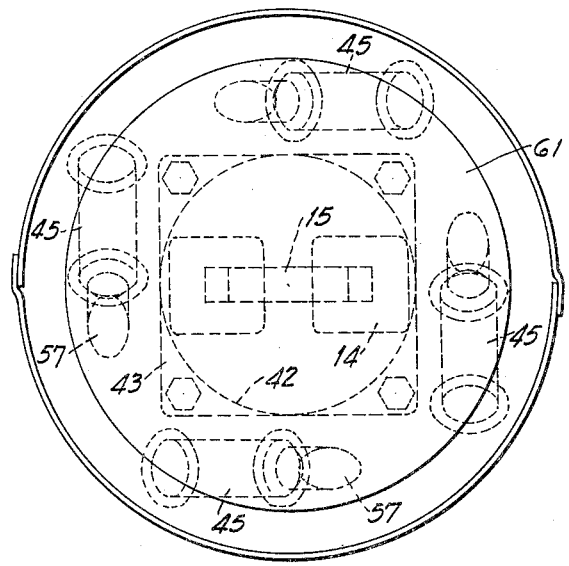
Fig. 8 is a plan view of the motor shown in Fig. 7 to illustrate the arrangement of the vibratory supporting means.

The base casting 40 is provided with four sloping holes 45, each of which is placed at 90° from each other symmetrically around the casting as shown in Fig. 8. The slope of the holes 45 is substantially 45° to the horizontal.

The openings 45 are provided with annular shoulder 46 at their lower end and a tube to provide an annular shoulder 47 at the upper end. Each of these shoulders is normal to the axis of the opening 45.

Each of the holes 45 is provided with a dual elastomer spring element 50 which comprises an outer cylindrical shell member 51, which is flanged at 52 seated on the annular shoulders at the end of each opening, and an inner tube member 53 with the elastomer material 54 being vulcanized between the shell member 51 and the tube 53 and having its ends undulated as illustrated at 55.

The tubes 54 are constructed to receive the bolts 56 which are secured in the threaded openings in the lugs 57. One end of the elastomer members 50 and their tubes 53 project beyond the cylinders 51 for engagement. The ends of the studs 56 have washers 58 for engaging the protruding ends of the springs which are held in locked position by the nuts 59. By taking up the nuts 60 the tubes 53 may be drawn toward one another and thereby displace both the elastomer members accordingly as flexure permits axial movement of the stud 56. Thus the elastomer material between the shells and the tubes is placed under shear. By tightening the bolts 56 a certain amount of shear is placed on each of the elastomer members to preload them to tune the same so that the frame 61, which is thus resiliently supported for vibration in a confined inclined arcuate path of movement, has a natural period of a few cycles from the driving frequency of the pulsating driving current.

It will be noted that the armature 16 is disposed directly above the core member 15 and is drawn downwardly by the same. However, the disposition of the elastomer members being at an angle relative to the horizontal causes the frame member 61 to be vibrated in a confined inclined arcuate path of movement in the same manner as the structure of Figs. 1 and 2, and the elastomer members with their respective studs 56 guide this movement of the frame 61.

Thus, the motor with the oppositely facing pole faces may be employed to operate a feeder or other type of motor constructed about a central axis regardless of whether the same is supported by leaf springs or elastomer members. However the term "tuned spring means" as employed in the claims includes the flat leaf springs 5 as well as the elastomer members 41.

I claim:

1. A vibratory motor comprising a base, a frame constructed to be symmetrical about a central axis, a plurality of tuned spring means disposed at an incline and positioned symmetrically about said central axis with their opposite ends attached to said base and to said frame to support the latter for reciprocation in a confined inclined arcuate path of movement about said central axis, a single electromagnetic motor having an armature member and a field member, said armature member having a pair of spaced pole faces, said field member including a core with a pair of spaced pole faces to co-operate with the pair of pole faces on said armature, means for mounting said motor member axially and symmetrically relative to said central axis and in operative spaced relation with one motor member secured to said base and the other motor member secured to said frame, each pole face of a pair facing in opposite directions to one another to be effective in imparting their magnetic reciprocating impulses between the field core and the armature member at an angle to the central axis to reciprocate said frame in its confined inclined arcuate path of movement.

2. The structure of claim 1 characterized in that said pole faces are inclined at an angle substantially the same as the inclined angle of the spring means.

3. The structure of claim 1 characterized in that the pole faces of said armature member extend beyond the intermediate portion of said armature.

4. The structure of claim 1 characterized in that the pole faces of said armature member are formed within the dimensions of the intermediate portion of said armature.

5. The structure of claim 1 characterized in that said pole faces are inclined at an angle substantially the same as the inclined angle of the spring means, and the adjacent pole faces and spring means slope in the same direction.

6. The structure of claim 1 characterized in that said pole faces are inclined at an angle substantially the same as the inclined angle of the spring means, and the adjacent pole faces and spring means slope in opposite directions.

7. The structure of claim 1 characterized in that said pole faces are inclined at an angle substantially the same as the inclined angle of the spring means, and the pole faces of the field member core lie in vertical planes and the pole faces of the armature member lie on opposite sides thereof.

CARL S. WEYANDT.

References Cited in the file of this patent

UNITED STATES PATENTS

| Number | Name | Date |
|---|---|---|
| 2,094,697 | Flint | Oct. 5, 1937 |

FOREIGN PATENTS

| Number | Country | Date |
|---|---|---|
| 290,006 | Great Britain | May 10, 1928 |